Oct. 14, 1969          R. C. BUELER          3,472,559
CONTROL VALVE
Filed Sept. 5, 1967
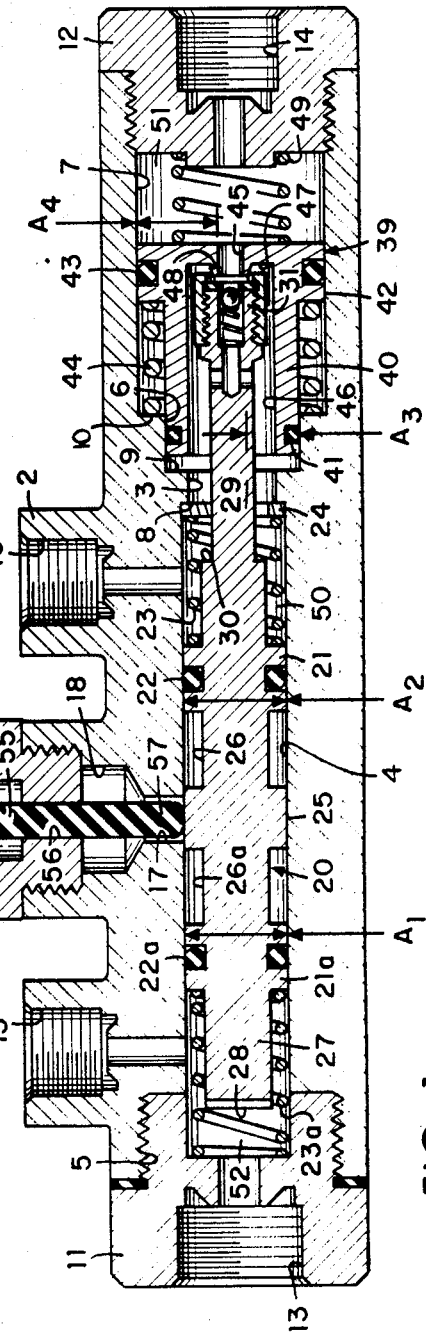
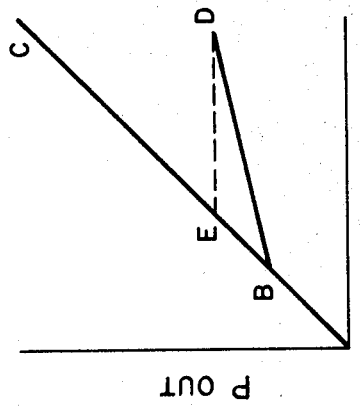
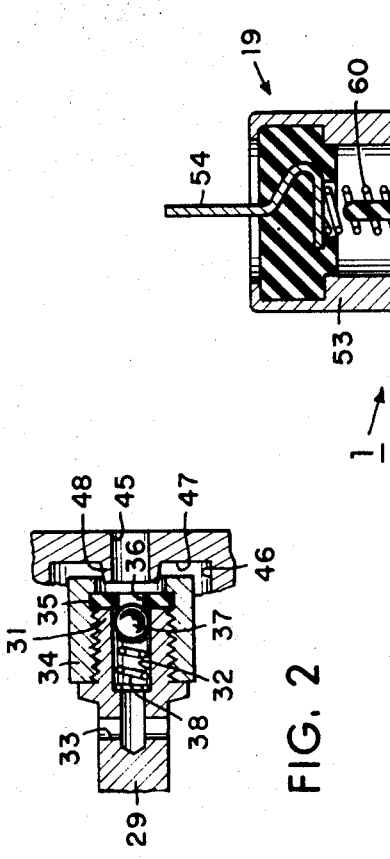
INVENTOR
RICHARD C. BUELER
BY
Joseph E. Papin United States Patent Office 3,472,559
Patented Oct. 14, 1969

3,472,559
CONTROL VALVE
Richard C. Bueler, Glendale, Mo., assignor to Wagner Electric Corporation, Newark, N.J., a corporation of Delaware
Filed Sept. 5, 1967, Ser. No. 665,489
Int. Cl. B60t *15/14*
U.S. Cl. 303—6    22 Claims

ABSTRACT OF THE DISCLOSURE

A control valve including switch means for comparing the magnitudes of separate fluid pressures supplied thereto and movable toward opposed switch positions in response to a predetermined differential between the magnitudes of the separately supplied fluid pressures, and metering means for metering engagement with a portion of said switch means to control the application through said control valve of one of the supplied fluid pressures.

---

This invention relates in general to dual or split fluid pressure systems and in particular to control valves for warning of system failure and controlling pressure fluid flow through one of said systems.

In the past, dual or split fluid pressure systems were provided with a control or driver warning valve which was responsive to a fluid pressure failure in one of the dual systems to light a driver warning or dash lamp and also with another control or proportioning valve which proportioned the fluid pressure in one of the dual systems delivered to one vehicle brake set. One of the disadvantageous or undesirable features of such past constructions was that the driver warning valves and proportioning valves were separate units, which not only affected the cost of manufacturing but also the cost of assembly, both of the valves per se and on the vehicle, and the utilization of such separate valve units also presented a space factor problem since under-the-hood space in modern vehicles is becoming critical. Another of the disadvantageous or undesirable features of such past construction was that the proprotioning valve continued to proportion the fluid pressure applied to the one vehicle brake set even though a failure had occurred in the portion of the dual system connected with the other vehicle brake set. And still another disadvantageous or undesirable feature of such past constructions was that since the two valves were separate, the inherent characteristics, such as structural arrangements and/or operational movements thereof, indigenous to each, could not effectively combine or interrelate with one another.

The primary object of the present invention is to provide a control valve which overcomes the aforementioned disadvantageous or undesirable features, and this, as well as other objects and advantageous features of the present invention, will become apparent hereinafter.

In the drawings wherein like numerals refer to like parts wherever they occur:

FIG. 1 is a sectional view showing a control valve embodying the present invention in cross-section, FIG. 2 is a fragmentary sectional view taken from FIG. 1 showing the metering portion thereof in cross-section, and FIG. 3 is a graphical representation illustrating the output pressure effected by the control valve of FIG. 1 in response to the input pressure supplied thereto.

Briefly, the invention comprises a control valve having means for comparing separate fluid pressures supplied thereto and movable toward opposed translated positions in response to a predetermined differential between the separate fluid pressure magnitudes, and metering means for metering engagement with said first named means to control the application through said control valve of one of the supplied fluid pressures.

Referring now to FIG. 1, a control valve, indicated generally at 1, is provided with a housing 2 having a bore 3 interposed between opposed stepped counterbores 4, 5 and 6, 7, and shoulders 8, 9 and 10 are provided on said housing between said bore and counterbores 4, 6, and between said counterbores 6, 7, respectively. Closure members or end plugs 11, 12 are threadedly received in the open ends of counterbores 5, 7, and outlet ports 13, 14 are provided in said closure members 11, 12 connecting with the counterbores 4, 7, said outlet ports being adapted for connection with separate vehicle brake sets (not shown), such as for instance the front and rear brakes, respectively. Inlet ports 15, 16 are provided in the housing 2 connecting with the counterbore 4 adjacent to the leftward and rightward ends thereof, respectively, and said inlet ports are adapted for connection with the separate fluid pressure generating chambers of a dual or split type master cylinder (not shown) of a type well known in the art. A cross-bore 17 is provided in the housing 2 having one end intersecting the counterbore 4 adjacent the mid-portion thereof between said inlet ports 15, 16, and the other end thereof connects with a cross-counterbore 18 which is threaded at its open end to receive an electrical switch mechanism, indicated generally at 19, to be discussed hereinafter.

A switch actuating member or control piston, indicated generally at 20, is shown in its normal operating or centered position having opposed flanges 21, 21a with peripheral seals 22, 22a disposed therein and slidably received in the housing counterbore 4 between the inlet ports 15, 16, respectively, said opposed flanges having opposed substantially equal effective areas $A_1$, $A_2$ respectively responsive to fluid pressure at the inlet ports 15, 16, and opposed centering or motion impeding springs 23, 23a are respectively interposed between the piston flange 21 and an abutment or spring retainer 24 biased against the housing shoulder 8 and between the piston flange 21a and the closure member 11. The piston 20 is provided with a land 25 between the flanges 21, 21a which is slidable in the housing counterbore 4 and normally positioned beneath the housing cross-bore 17 when said piston is in its centered position, as shown, and locking grooves 26, 26a are provided in said piston on opposed sides of said land. The piston flange 21a is provided with an integral extension 27 having a free end 28 for motion limiting or abutting engagement with the closure member 11, and the piston flange 21 is provided with an integral extension 29 having an abutment or annular shoulder 30 defined thereon for motion limiting or abutting engagement with the spring retainer 24 and having a free end 31 extending coaxially into the housing counterbore 7.

Referring now also to FIG. 2, the free end 31 of the piston extension 29 is provided with an axial stepped passage 32 therethrough intersected at its leftward end by a cross-passage 33, and the peripheral portion of said piston extension adjacent to said free end 31 is threaded to receive a valve seat retaining member 34. An annular resilient valve element or seat 35 is retained against displacement between said piston extension free end 31 and the retaining member 34 and is provided with a central or axial passage 36 therethrough connecting with the axial stepped passage 32, and a uni-directional flow or check valve 37 is movable in the stepped passage 32 being biased into engagement with the valve seat 35 by a valve spring 38 of negligible compressive force interposed between said check valve and the shoulder defined by said stepped passage.

A proportioning member or metering piston, indicated generally at 39, is provided with a sleeve portion 40 slidable in the housing counterbore 6 and having a peripheral seal 41 therein in sealing engagement with said housing counterbore, and a radially extending head portion 42 is integrally connected with said sleeve portion and slidable in the counterbore 7, said head portion having a peripheral seal 43 in sealing engagement with the housing counterbore 7. A proportioning or metering spring 44 is biased between the housing shoulder 10 and the metering piston head portion 42 normally urging the metering piston 39 toward the outlet port 14, and axial stepped bores 45, 46 are provided through the metering piston 39 having a shoulder 47 therebetween defining a valve seat or element 48 for cooperative engagement with the switch piston valve seat 35. A return spring 49 of negligible compressive force is biased between the metering piston head portion and the closure member 12.

It should be noted that an annular effective area $A_3$ is defined on the metering piston between the stepped bore 45 thereof and the housing counterbore 6, said area $A_3$ being responsive to the fluid pressure at the inlet port 16, and another annular effective area $A_4$ is also defined on said metering piston between said stepped bore 45 and the housing counterbore 7, said area $A_4$ being predeterminately greater than and opposed to said area $A_3$ and responsive to the fluid pressure at the outlet port 14. Further, an inlet chamber 50 is defined in the housing bore 3 and counterbores 4, 6 and the metering piston stepped bore 46 between the switch piston flange 21 and the metering piston shoulder 47 in open pressure fluid communication with the inlet port 16, and an outlet chamber 51 is defined in the housing counterbore 7 between the metering piston head 42 and the end plug 12 in open pressure fluid communication with the outlet port 14. Another inlet chamber 52 is defined in the housing counterbore 4 between the switch piston flange 21a and the end plug 11 in open pressure fluid communication with both the inlet and outlet ports 15, 13; however, it is well known inthe art to connect the inlet port 15 in parallel circuit relation between the tandem master cylinder and the front brake set (not shown) thereby obviating the necessity of providing the outlet port 13 in the housing 2.

The electrical switch 19, as previously mentioned, includes a conductive closure or plug member 53 threadedly and conductively received in the housing cross-bore 18, and a metal terminal 54 extends through said member and is insulated therefrom, said terminal having an exterior end for connection in an electrical circuit of a type well known in the art for selectively energizing a driver warning or dash lamp (not shown). A non-conductive switch operating member 55 is slidably received in a bore 56 provided in the plug member 53, said switch operating member having a lower end or follower portion 57 extending through the housing cross-bore 17 for engagement with the piston land 25 and having a conductive contact 58 on the upper end portion thereof for electrical engagement with another contact 59 on the plug member. To complete the description of the control valve 1, a current carrying spring 60 is interposed between the interior end of the terminal 54 and the switch member contact 58 urging it toward engagement with the contact 59 and urging the follower portion 57 of the switch member 55 into positioning engagement with the piston land 25.

In the operation with the component parts of the control valve 1 positioned as shown in FIG. 1 and as described hereinabove, independent or separately supplied input fluid pressure $P_1$, $P_2$ normally having substantially equal magnitudes are applied upon operator actuation of the tandem or split system tape master cylinder (not shown) to the inlet ports 15, 16, respectively, of said control valve. The input fluid pressure $P_1$ flows from the inlet port 15 into the inlet chamber 52 acting on the switch piston area $A_1$ to establish a force $P_1A_1$, and the input fluid pressure $P_2$ flows from the inlet port 16 into the inlet chamber 50 acting on the switch piston area $A_2$ to establish a force $P_2A_2$ opposed to the force $P_1A_1$. The inlet fluid pressure $P_2$ in the inlet chamber 50 also acts on the effective area $A_3$ of the metering piston 39 to establish another force $P_2A_3$ and also flows through the switch piston stepped bore 45 into the outlet chamber 51 and therefrom to the outlet port 14 to establish an output fluid pressure $Po$. The output fluid pressure $Po$ at the output port 14 and in the outlet chamber 51 acts on the effective area $A_4$ of the metering piston 39 to establish an output force $PoA_4$ which is opposed to the input force $P_2A_3$ acting on said metering piston. Since the input fluid pressures $P_1$, $P_2$ and the areas $A_1$, $A_2$ have previously been respectively defined as substantially equal, it is obvious that the force $P_1A_1$ is substantially equal and opposed to the force $P_2A_2$; therefore, the switch piston 20 is relatively unaffected by the fluid pressures acting thereon and will remain substantially in its centered position, as shown. Since the input and output fluid pressures $P_2$, $Po$ are initially equal and since the area $A_4$ is greater than the area $A_3$ of the metering piston 39, it is obvious that the output force $PoA_4$ is greater than the input forme $P_2A_2$; however, the compressive force $Fc$ of the metering spring 44 prevents movement of the metering piston 99 until the input and output fluid pressures $P_2$, $Po$ exceed a predetermined value, as shown by the line OB in the graphical representation of FIG. 2. When the predetermined value B of the input and output fluid pressures $P_1$, $Po$ is attained, the output force $PoA_4$ overcomes the additive input and spring forces $P_2A_3$, $Fc$ to move the metering piston 39 from its original position in a leftward direction toward an operative or metering position to store the energy of the spring 44. This leftward movement of the metering piston 39 engages the valve element 48 thereof with the switch piston valve element 35 to isolate the input fluid pressure $P_2$ in the inlet chamber 50 from the output fluid pressure $Po$ in the output chamber 51, and upon the engagement of said valve seat and valve element, the input force $P_2A_3$ and the spring force $Fc$ are substantially equal to and balanced by the output force $PoA_4$.

From the graphical representation in FIG. 3, it is obvious that increases in the magnitude of the input fluid pressure $P_2$ in excess of the predetermined value B, as shown by the line OBEC, will result in proportionally reduced increases in the output fluid pressure $Po$, as shown by the line BD. For instance, when the input fluid pressure $P_2$ is increased to a value in excess of the predetermined value B, the input force $P_2A_3$ is correspondingly increased and additive to the spring force $Fc$ to overcome the output force $PoA_5$; therefore, the metering piston 39 is moved rightwardly toward a metering position disengaging the valve element 48 thereof from the switch piston valve element 35 to effect a metered application of the increased input fluid pressure $P_2$ through the metering piston stepped bore 45 and the outlet chamber 51 to the outlet port 14 to effect a proportional increase of the output fluid pressure $Po$ in a predetermined ratio with input fluid pressure $P_2$ at the inlet port 16, as shown by the line BD in the graph of FIG. 2 wherein $$Po = \frac{P_2A_3 + Fc}{A_4}$$

Of course, the increased output fluid pressure $Po$ effects a corresponding increase in the output force $PoA_4$, and when the increased output force $PoA_4$ attains an increased value substantially equal to that of the increased input force $P_2A_3$ and the additive spring force $Fc$, the metering piston 39 is again moved leftwardly to re-engage the valve element 48 thereof with the switch piston valve element 35 to again isolate the increased input and output fluid pressures $P_2$, $Po$. It is, of course, obvious that the metering piston 39 will be responsive to further increases in the input fluid pressure $P_2$ to effect further corresponding proportional increases in the output fluid pressure Po in the same manner as previously described, and it should also be noted that as the input fluid pressure $P_2$ is increased, the separate input fluid pressure $P_1$ is also equally increased to maintain the forces $P_2A_2$ and $P_1A_1$ substantially equal across the switch piston 20 obviating displacement movement thereof from its centered position.

When the split system master cylinder is de-actuated, the input fluid pressures $P_1$, $P_2$ are vented to atmosphere, said input fluid pressure $P_2$ flowing from the input chamber 50 to the inlet port 16 and said input fluid pressure $P_1$ flowing from the outlet port 13 through the chamber 52 to the inlet port 15. In this manner, the forces $P_1A_1$ and $P_2A_2$ acting on the switch piston 20, as well as the input force $P_2A_3$ acting on the metering piston 39, are eliminated. When the magnitude of the input fluid pressure $P_2$ is so reduced to the value E on the line OBEC in the graph of FIG. 3, which is the value substantially equal to that of the output fluid pressure Po, a pressure differential is established between the input and output fluid pressures $P_2$, Po across the check valve 37, and the output fluid pressure Po acting on the effective area of the check valve 37 displaces said check valve from engagement with the valve element 35 against its spring 38 to open the valve element passage 36 and permit return flow of the displace output fluid pressure Po from the outlet port 14 through the outlet chamber 51, the stepped bore 45, the valve element passage 36 and the switch piston stepped passage 32 and cross-passage 33 into the inlet chamber 50 and therefrom to the inlet port 16. When the return flow of the output fluid pressure Po reduces the magnitude thereof to a value wherein the output force $PoA_4$ is overcome by the compressive force Fc of the spring 44, said spring 44 moves the metering piston 39 rightwardly against the force of the return spring 49 toward its original position disengaging the valve element 48 thereof from the switch piston valve element 35 establishing open pressure fluid communication between the inlet and outlet ports 14, 16 and thereby eliminating the output force $PoA_4$. Upon disengagement of the metering piston valve element 48 from the switch piston valve element 35, the pressure differential thereacross is eliminated and the check valve spring again re-engages the check valve 37 with the switch piston valve element 35 closing the passage 36 thereof. The return flow of the output fluid pressure Po is illustrated in in the graph of FIG. 2 by the dotted line DE and the line EBO.

In the event that a sustained pressure differential is established between the separately supplied input fluid pressures $P_1$, $P_2$ due to a malfunction of the split system master cylinder, leaks or the like, wherein the magnitude of the supplied fluid pressure $P_2$ exceeds that of supplied fluid pressure $P_1$ by a predetermined value, the force $P_2A_2$ acting on the switch piston will, of course, overcome the reduced opposing force $P_1A_1$ acting thereon and will displace said switch piston from its centered position leftwardly toward its leftward displaced or translated position engaging the switch piston abutment 28 with the end plug 11. Of course, due to the failure of the input fluid pressure $P_1$, it is desirable to obviate the proportioning function of the proportioning member 39 in order to attain an unaltered or maximum fluid pressure at the outlet port 14, i.e., wherein Po is equal to $P_2$. It should be noted that the distance of the translatory movement between the switch piston abutment end 28 and the end plug 11 is greater than the distance of the movement between the leftward end of the metering piston 39 and the housing shoulder 9; therefore, it is obvious that when the control piston 20 is in its leftward translated or displaced position, the proportioning piston valve element 48 cannot engage the switch piston valve element 35 to effect the metered application of the input fluid pressure between the input and output ports 16, 14. With the switch piston 20 in its leftwardly translated position, the output force $PoA_4$ will overcome the input force $P_2A_3$ respectively acting on the proportioning piston 39 to effect movement thereof against the spring 44 toward a disabled position abuttingly engaging the leftward end of the proportioning piston sleeve member 40 with the housing shoulder 9; however, as previously mentioned, this movement of the proportioning piston 39 to its disabled position cannot engage the valve element 48 thereof with the switch piston valve element 35 so that the proportioning piston stepped bore 45 remains open to permit the unmetered or unrestricted flow of the input fluid pressure $P_2$ to the output port 14 wherein Po and $P_2$ are equal. The movement of the switch piston 20 to its leftwardly translated position displaces the positioning land 25 from beneath the housing cross-bore 17 and aligns the locking groove 26 therewith, and thereafter the compressive force of the switch spring 60 displaces the follower end 57 of the spring operating member 55 downwardly into the housing counterbore 4 and into locking engagement with the locking groove 26 to prevent the return movement of said switch piston toward its centered position in response to the compressive force of the centering spring 23a when the split system master cylinder is de-actuated to eliminate the input fluid pressures $P_1$,$P_2$. This downward movement of the switch operating member 55 also engages the contact 58 thereof with the cooperating contact 59 of the switch plug member 53 to complete the electrical circuit and energize the driver warning dash lamp (not shown). In order to re-center the switch piston 20 when the fluid pressure deficiency of the system is corrected, the plug member 53 of the switch 19 is threadedly disengaged from the housing cross-bore 18 to disengage the follower end 57 of the switch operating member 55 from locking engagement with the locking groove 26, and the centering spring 23a thereafter returns the switch piston 20 to its centered position with the positioning land 25 thereof beneath the housing cross-bore 17 for positioning engagement with the switch piston operating member follower end 57 when the switch plug member 53 is manually re-engaged with the housing cross-bore 18.

In the event that an oppositely directed differential is established between the input fluid pressures due to a malfunction of the split master cylinder, leaks or the like, wherein the magnitude of the supplied fluid pressure $P_1$ exceeds that of the applied fluid pressure $P_2$ by a predetermined value, the force $P_1A_1$ acting on the switch piston 20 will, of course, overcome the opposing reduced force $P_2A_2$ acting thereon to move said piston from its centered position toward its rightward displaced or translated position. This rightward displacement of the switch piston 20 initially engages the valve element 35 thereof with the proportioning piston valve seat 48 and the rightward end of the retainer 34 with the proportioning piston shoulder 47 to thereafter drive the proportioning piston 39 rightwardly against its return spring 49 toward a disabled position in the counterbore 7. It should be noted that this concerted rightward movement of the switch piston 20 and the proportioning piston 39 toward their rightward displaced positions also disables the metering spring 44 and is limited by the engagement of the shoulder 30 on the switch piston extension 31 with the spring retainer 24. This concerted rightward movement also displaces the positioning land 25 from the follower end 57 of the switch operating member 51 to permit displacement thereof by the compressive force of the switch spring 60 into locking engagement with the locking groove 26 to maintain said switch piston 20 in its rightward displaced position against the compressive force of the centering spring 23. Of course, the downward movement of the switch operating member 55 again will move the contact 58 thereof into engagement with its cooperating contact 59 to complete the electrical circuit and energize the driver warning dash lamp (not shown).

From the foregoing, it is now apparent that a control valve meeting the objects and advantageous features set forth hereinabove, as well as other objects and advantageous features, is provided and that changes as to the precise configurations, shapes or other details of the construction set forth in the disclosure by way of illustration may be made by those skilled in the art without departing from the spirit of the invention.

The embodiments of the invention in which an exclusive property or privilege is claimed are defined as follows:

1. A control valve comprising a housing, metering means movable in said housing to control the application through said housing of fluid pressure supplied thereto, other means in said housing for metering engagement with said metering means, resilient means urging said metering means toward a position disengaged from said other means to effect the application through said housing of the supplied fluid pressure less than a predetermined value, opposed differential areas on said metering means respectively subjected to the supplied and applied fluid pressures, said metering means being initially movable against the force of said resilient means toward a position in metering engagement with said other means isolating the supplied and applied fluid pressures when the magnitudes thereof acting on said opposed differential areas attain the predetermined value, and said metering means also being thereafter further movable in response to increases in the supplied fluid pressure in excess of the predetermined value acting on one of said opposed differential areas and assisted by the force of said resilient means toward another position disengaged from said other means and effecting a metered increase in the applied fluid pressure acting on the other of said opposed differential areas in a predetermined ratio with the increased supplied fluid pressure, passage means in said other means for the return flow of the applied fluid pressure when said metering means is positioned in metering engagement with said other means, and uni-directional valve means in said passage means and subjected to the supplied and applied fluid pressures for controlling the return flow of the applied fluid pressure therethrough, said valve means being movable in response to the applied fluid pressure acting thereon toward a position in said passage means establishing the return flow through said passage means of the applied fluid pressure to reduce the magnitude thereof upon the reduction of the magnitude of the supplied fluid pressure to a value less than that of the applied fluid pressure, said metering means being thereafter movable toward its original position in said housing when the force of said resilient means overcomes that of the reduced magnitude of the applied fluid pressure acting on said other opposed differential area, said other means being movable in said housing, opposed effective areas on said other means respectively subjected to the first named supplied fluid pressure and another fluid pressure supplied to said housing, said other means being movable toward a disabled position in said housing out of metering engagement with said metering means to obviate the metering effect thereof on said first named supplied fluid pressure in response to the first named supplied fluid pressure acting on one of said opposed effective areas in the event of the failure of the other supplied fluid pressure acting on the other of said opposed effective areas, and means on said housing for engagement with said metering means to limit movement thereof against said resilient means toward metering engagement with said other means when said other means is in its disabled position.

2. A control valve comprising a housing, metering means movable in said housing to control the application through said housing of fluid pressure supplied thereto, other means in said housing for metering engagement with said metering means, resilient means urging said metering means toward a position disengaged from said other means to effect the application through said housing of the supplied fluid pressure less than a predetermined value, opposed differential areas on said metering means respectively subjected to the supplied and applied fluid pressures, said metering means being initially movable against the force of said resilient means toward a position in metering engagement with said other means isolating the supplied and applied fluid pressures when the magnitudes thereof acting on said opposed differential areas attain the predetermined value, and said metering means also being thereafter further movable in response to increases in the supplied fluid pressure in excess of the predetermined value acting on one of said opposed differential areas and assisted by the force of said resilient means toward another position disengaged from said other means and effecting a metered increase in the applied fluid pressure acting on the other of said opposed differential areas in a predetermined ratio with the increased supplied fluid pressure, passage means in said other means for the return flow of the applied fluid pressure when said metering means is positioned in metering engagement with said other means, and uni-directional valve means in said passage means and subjected to the supplied and applied fluid pressures for controlling the return flow of the applied fluid pressure therethrough, said valve means being movable in response to the applied fluid pressure acting thereon toward a position in said passage means establishing the return flow through said passage means of the applied fluid pressure to reduce the magnitude thereof upon the reduction of the magnitude of the supplied fluid pressure to a value less than that of the applied fluid pressure, said metering means being thereafter movable toward its original position in said housing when the force of said resilient means overcomes that of the reduced magnitude of the applied fluid pressure acting on said other opposed differential area, said other means being movable in said housing, opposed effective areas on said other means respectively subjected to the first named supplied fluid pressure and another fluid pressure supplied to said housing, said other means being movable into driving engagement with said metering means to thereafter concertedly move said metering means toward a position in said housing obviating the metering actuation thereof and disengaged from said resilient means in response to the other supplied fluid pressure acting on one of said opposed effective areas in the event of the failure of said first named supplied fluid pressure acting on the other of said opposed effective areas.

3. A control valve comprising a housing, metering means movable in said housing to control the application through said housing of fluid pressure supplied thereto, other means in said housing for metering engagement with said metering means, resilient means urging said metering means toward a position disengaged from said other means to effect the application through said housing of the supplied fluid pressure less than a predetermined value, opposed differential areas on said metering means respectively subjected to the supplied and applied fluid pressures, said metering means being initially movable against the force of said resilient means toward a position in metering engagement with said other means isolating the supplied and applied fluid pressures when the magnitudes thereof acting on said opposed differential areas attain the predetermined value, and said metering means also being thereafter further movable in response to increases in the supplied fluid pressure in excess of the predetermined value acting on one of said opposed differential areas and assisted by the force of said resilient means toward another position disengaged from said other means and effecting a metered increase in the applied fluid pressure acting on the other of said opposed differential areas in a predetermined ratio with the increased supplied fluid pressure, passage means in said other means for the return flow of the applied fluid pressure when said metering means is positioned in metering engagement with said other means, and uni-directional valve means in said passage means and subjected to the supplied and applied fluid pressures for controlling the return flow of the applied fluid pressure therethrough, said valve means being movable in response to the applied fluid pressure acting thereon toward a position in said passage means establishing the return flow through said passage means of the applied fluid pressure to reduce the magnitude thereof upon the reduction of the magnitude of the supplied fluid pressure to a value less than that of the applied fluid pressure, said metering means being thereafter movable toward its original position in said housing when the force of said resilient means overcomes that of the reduced magnitude of the applied fluid pressure acting on said other opposed differential area, said other means being movable in said housing to compare the magnitude of another fluid pressure supplied to said housing with that of said first named supplied fluid pressure, opposed effective areas on said other means respectively subjected to said first named and other supplied fluid pressures, said other means being movable in one and opposite directions toward one and opposite non-metering positions in said housing in response to a predetermined differential between said first named and other supplied fluid pressures respectively acting on said opposed effective areas, opposed abutment means in said housing for engagement with said other means and defining the one and other non-metering positions thereof, respectively, said other means being movable in the one direction toward its one non-meteing position into engagement with one of said opposed abutment means and out of metering engagement with said metering means to obviate the metering actuation thereof in response to the first named supplied fluid pressure acting on one of said opposed effective areas in the event that the magnitude of the other supplied fluid pressure acting on the other of said opposed effective areas is reduced to a value less than that of the first named supplied fluid pressure establishing the predetermined differential, and means on said housing for engagement with said metering means to limit movement thereof against said resilient means toward metering engagement with said other means when said other means is in its one non-metering position, said other means also being movable in the opposite direction toward its opposite non-metering position in engagement with the other of said opposed abutment means to engage and concertedly move said metering means out of engagement with said resilient means thereby also obviating the metering actuation thereof in response to the other supplied fluid pressure acting on said other opposed effective area in the event that the magnitude of the first named supplied fluid pressure acting on said one opposed effective area is reduced to a value less than that of said other supplied fluid pressure establishing the predetermined differential.

4. A control valve comprising a housing having a pair of input ports and an output port therein, means in said housing for comparing the magnitudes of separate fluid pressures at said input ports and movable in said housing in one and other directions toward opposed translated positions in response to a predetermined differential between the magnitudes of the fluid pressures at said input ports acting thereon, other means movable in said housing for metering engagement with said first named means to control pressure fluid communication between one of said input ports and said output port, resilient means for urging said other means toward a position disengaged from said first named means to normally establish open pressure fluid communication between said one input port and said output port, opposed differential areas on said other means respectively responsive to the fluid pressure at said one input port and said output port, said other means being initially movable against the force of said resilient means toward a position in metering engagement with said first named means isolating said one input port and said output port when the magnitude of the fluid pressures at said one input port and said output port respectively acting on said opposed differential areas attain a predetermined value and said other means also being thereafter further movable in response to increases in the fluid pressure in excess of the predetermined value at said one input port acting on one of said opposed differential areas and assisted by the force of said resilient means toward another position disengaged from said other means and establishing metered pressure fluid communication between said one input port and said output port to increase the fluid pressure at said output port acting on the other of said opposed differential areas in a predetermined ratio with the increased fluid pressure at said one input port, valve means in said first named means and responsive to the fluid pressure at said one input port and at said output port for controlling pressure fluid communication therebetween when said other means is positioned in metering engagement with said first named means, said valve means being movable toward a position establishing pressure fluid communication between said one input port and said output port to reduce the fluid pressure at said output port upon the reduction of the fluid pressure at said one input port to a value less than that of the fluid pressure at said output port, and said other means being thereafter movable from its position in metering engagement with said first named means to its original position establishing open pressure fluid communication between said one input port and said output port when the force of said resilient means overcomes that of the reduced fluid pressure at said output port acting on said other opposed differential area, opposed effective areas on said first named means respectively subjected to the fluid pressures at said one input port and the other of said input ports, said first named means being movable in the one direction toward one of its opposed translated positions and out of metering engagement with said other means to obviate the metering actuation thereof and establish open pressure fluid communication between said one input port and said output port in response to the fluid pressure at said one input port acting on one of said opposed effective areas in the event that the magnitude of the fluid pressure at said other input port acting on the other of said opposed effective areas is reduced to a value less than that of the fluid pressure at said one input port to establish the predetermined differential therebetween, and means on said housing for engagement with said other means to limit movement thereof against said resilient means toward metering engagement with said first named means when said first named means is in its one translated position, said first named means also being movable in the opposite direction toward the other of its translated positions in response to the fluid pressure at said other input port acting on said other opposed effective area in the event that the magnitude of the fluid pressure at said one input port acting on said one opposed effective area is reduced to a value less than that of the fluid pressure at said other input port estabilshing the predetermined differential therebetween to engage and concertedly move said other means out of engagement with said resilient means thereby also obviating the metering actuation of said other means.

5. The control valve according to claim 4, comprising passage means in said first named means for connection between said one input port and said output port upon the metering engagement of said other means and said first named means, said valve means being movable in said passage means.

6. The control valve according to claim 5, comprising a valve seat on said first named means in circumscribing relation to said passage means, other resilient means normally urging said valve means into engagement with said valve seat interrupting pressure fluid communication between said one input port and output port and in a direction to permit pressure fluid flow through said passage means only from said output port to said input port upon actuation of said valve means.

7. The control valve according to claim 4, comprising a valve seat on said first named means, passage means in said other means between said one input port and said output port, and a valve element on said other means in circumscribing relation with said passage means for metering engagement with said valve seat to control pressure fluid communication through said passage means between said one input port and said output port upon the actuation of said other means.

8. The control valve according to claim 4, comprising passage means in said other means between said one input port and said output port, a valve element on said other means in circumscribing relation with said passage means, extension means on said first named means having an end portion thereon defining a valve seat for metering engagement with said valve element upon actuation of said other means, and other passage means in said extension means extending through said valve seat for connection between said one input port and said output port when said valve element is in metering engagement with said valve seat, said valve means being movable in said other passage means.

9. The control valve according to claim 8, comprising another valve seat on said extension means in circumscribing relation with said other passage means and opposed to said first named valve seat, other resilient means normally urging said valve means into engagement with said other valve seat to permit flow through said other passage means only from said output port to said one input port.

10. The control valve according to claim 4, wherein said other opposed differential area is predeterminately larger than said one opposed differential area.

11. The control valve according to claim 4, comprising opposed abutment means on said housing for engagement with said first named means and defining the opposed translated positions thereof.

12. A control valve comprising a housing having three fluid pressure ports therein, first means movable in said housing between two of said ports, a valve seat on said first means, second means movable in said housing between one of said two ports and said third port, passage means in said second means between said one of said two ports and said third port, valve means on said second means in circumscribing relation with said passage means for metering engagement with said valve seat, spring means engaged between said housing and said second means normally urging said valve means toward an inoperative position disengaged from said valve seat, a pair of opposed areas on said second means for respective subjection to the fluid pressures at said one of said two ports and said third port, said second means being movable from its inoperative position against said spring means to position said valve means in metering engagement with said valve seat closing said passage means in response to an increase in the fluid pressures at said one of the said two ports and said third port acting on said pair of opposed areas to a predetermined value and said second means being thereafter further movable in response to a further increase in the fluid pressure at said one of said two ports in excess of the predetermined value acting on one of said areas and assisted by said spring means force to disengage said valve means from said valve seat to open said passage means and effect a metered increase in excess of the predetermined value of the fluid pressure at said third port acting on the other of said areas in a predetermined ratio with the increased fluid pressure in excess of the predetermined value at said one of said two ports, other valve means in said first means and responsive to the fluid pressures at said one of said two ports and said third port for controlling pressure fluid communication therebetween through said passage means when said first named valve means and valve seat are positioned in metering engagement, said other valve means being movable only to reduce the magnitude of the fluid pressure at said third port acting thereon upon a reduction in the magnitude of the fluid pressure at said one of said two ports acting thereon to a value less than that of the fluid pressure at said third port, said second means being thereafter movable by said spring means to its inoperative position disengaging said first named valve means from said valve seat when said spring means force overcomes that of the reduced fluid pressure at said third port acting on said other area, another pair of opposed areas on said first means respectively subjected to the fluid pressure at said one of said two ports and the other of said two ports, said first means being movable in response to a predetermined differential thereacross in one direction between the fluid pressures at said one and other of said two ports respectively acting on said other pair of areas to move said valve seat toward a non-metering position obviating metering engagement with said first named valve means and establishing open pressure fluid communication between said one of said two ports and said third port, third means in said housing for engagment with said second means to limit actuation thereof against said spring means and prevent movement of said first named valve means into engagement with said valve seat when said valve seat is in its non-metering position, and said first means also being movable in response to another predetermined differential thereacross in a direction opposite to the one direction between the fluid pressures at said one and other of said two ports to engage and thereafter concertedly drive said second means toward its inoperative position in said housing substantially eliminating the affect of said spring means force on said second means and thereby obviating the metering actuation of said valve seat and first named valve means.

13. A control valve comprising a housing having a bore therein, a pair of stepped counterbores in said housing connected with one end of said bore, a first shoulder on said housing between said counterbores, a pair of spaced input ports in said housing and connected with said bore, a first piston slidable in said bore between said input ports, an output port in said housing connected with one of said counterbores, a second piston including a sleeve portion slidable in the other of said counterbores, an enlarged head portion connected with said sleeve portion and slidable in said one counterbore between said first shoulder and said output port, a stepped bore extending through said sleeve and head portions between one of said input ports and said output ports, a second shoulder on said second piston between said head and sleeve portions and opposed to said first shoulder, a third shoulder on said second piston between said stepped bores, a valve element on said third shoulder in circumscribing relation with the smaller of said stepped bores and extending into the larger of said stepped bores, a first effective area on said second piston subjected to fluid pressure at said one input port, and a second effective area on said second piston opposed to and predeterminately greater than said first area and subjected to the fluid pressure at said output port, a spring interposed between said first and second shoulders urging said second piston in one direction toward said output port, an extension on said first piston extending substantially coaxially into said larger stepped bore and having an end portion thereon defining a valve seat for engagement with said valve element, said second piston being initially movable in a direction opposite to the one direction against the force of said spring in response to fluid pressure at said one input port and said output port less than a predetermined value respectively acting on said first and second areas toward a metering position engaging said valve element with said valve seat to isolate said one input port from said output port and said second piston being thereafter further movable in the one direction in response to increases in the fluid pressure at said one input port in excess of the predetermined value acting on said first area and assisted by the force of said spring to disengage said valve element from said valve seat and effect a metered increase in the fluid pressure at said output port acting on said second area in a predetermined ratio with the increased fluid pressure at said one input port, means in said first piston controlling the return flow of fluid pressure at said output port to said one input port when said second piston is in its metering position including passage means in said extension and extending substantially coaxially through said valve seat between said one input port and said output port, and a check valve normally urged to a closed position in said passage means, said check valve being movable toward an open position in said passage means establishing the return flow therethrough of the fluid pressure at said output port to said one input port to reduce the magnitude of the fluid pressure at said output port when the magnitude of the fluid pressure at said one input port is reduced to a value less than that of the fluid pressure at said output port, said second piston being thereafter movable from its metering position in the other direction toward its original position disengaging said valve element from said valve seat to re-establish open pressure fluid communication between said one input port and said output port when the reduced fluid pressure at said one input port acting on said first area and assisted by the force of said spring overcomes the opposing force of the reduced fluid pressure at said output port acting on said second area, third and fourth opposed substantially equal effective areas on said first piston respectively subjected to the substantially equal fluid pressures at said one input port and the other of sad input ports, and opposed abutments in said housing for engagement with said first piston, said first piston being movable in the one direction toward a disabled position into engagement with one of said opposed abutments in response to the fluid pressure at said one input port acting on said third area upon the failure of the fluid pressure at said other input port and said valve seat being movable therewith to obviate the metering engagement thereof with the valve element of the second piston means, and said first piston also being movable in the other direction toward another disabled position into engagement with the other of said opposed abutments in response to the fluid pressure at said other port acting on said fourth area upon the failure of the fluid pressure at said one input port to drivingly engage said valve seat with said valve element isolating said one input port from said output port and drive said second piston in the one direction toward a disabled position.

14. A control valve comprising a housing having a pair of fluid pressure input chambers, means movable in said housing between said chambers from a normally in response to oppositely directed differentials in excess centered position toward opposed translated positions of a predetermined amount between the magnitudes of the respective fluid pressures in said chambers, an output chamber in said housing, metering means movable in said housing between one of said input chambers and said output chamber and normally establishing pressure fluid communication therebetween, said metering means being movable in response to fluid pressure in said one input chamber and said output chamber of a predetermined value toward a position engaged with said first named interrupting pressure fluid communication between said one input chamber and said output chamber and being further movable in response to increases in the fluid pressure in said one input chamber in excess of the predetermined value toward a metering position disengaged from said first named means and establishing metered pressure fluid communication between said one input chamber and said output chamber to effect a metered ancrease of the fluid pressure in said output chamber in a predetermined ratio with the increased fluid pressure in said one input chamber in excess of the predetermined value, and other means in said first named means connected between said one input chamber and said output chamber when said metering means is engaged with said first named means and including valve means for controlling the return flow of fluid pressure from said output chamber to said input chamber, said valve means being movable in response to fluid pressure in said output chamber acting thereon toward a position establishing the return flow of fluid pressure from said output chamber to said one input chamber when the magnitude of the fluid pressure in said one input chamber is reduced to a value less than that of the fluid pressure in said output chamber.

15. A control valve comprising a housing, means for comparing the magnitudes of separate fluid pressures supplied thereto and movable in said housing from a normally centered position toward opposed translated positions in response to oppositely directed differentials in excess of a predetermined amount between the magnitudes of the supplied fluid pressures respectively acting thereon, metering means defining with said housing and said first named means a pressure fluid flow passage through said housing for one of the supplied fluid pressures and movable in said housing to control the application through said flow passage of the one supplied fluid pressure, said metering means being initially movable in response to the one supplied and applied fluid pressures of a predetermined value toward a position in said flow passage in metering engagement with said first named means in its centered position to isolate the one supplied fluid pressure from said applied fluid pressure and being thereafter further movable in response to increases in the one supplied fluid pressure in excess of the predetermined value toward a metering position in said flow passage disengaged from said first named means to effect a metered increase in the applied fluid pressure in a predetermined ratio with the increased one supplied fluid pressure in excess of the predetermined value, passage means in said first named means for the return flow of the applied fluid pressure when said metering means is engaged with said first named means, and valve means movable in said first named means for controlling said passage means and subjected to the one supplied fluid pressure and the applied fluid pressure when said metering means is engaged with said first named means, said valve means being movable in response to the applied fluid pressure acting thereon toward a position in said passage means establishing the return flow therethrough of the applied fluid pressure upon the reduction of the magnitude of the one supplied fluid pressure acting on said valve means to a value less than that of the applied fluid pressure.

16. A control valve according to claim 15, comprising a valve seat on said first named means about said passage means, said valve means being normally urged into engagement with said valve seat closing said passage means and being actuated toward an open position in said passage means disengaged from said valve seat to establish the return flow of the applied fluid pressure through said passage means upon the reduction of the magnitude of the one supplied fluid pressure to the value less than that of the applied fluid pressure.

17. A control valve according to claim 16, comprising resilient means engaged between said first named means and said valve means and normally urging said valve means toward engagement with said valve seat and in a direction to permit only the return flow of the applied fluid pressure through said passage means.

18. A control valve according to claim 15, comprising a valve seat on said first named means, other passage means in said metering means defining a portion of said flow passage, and means on said metering means defining other valve means about said passage means for metering engagement with said valve seat to control the application through said passage means of the one supplied fluid pressure.

19. A control valve according to claim 18, wherein said first named passage means extends through said valve seat for connection in pressure fluid communication with said other passage means when said other valve means is engaged with said valve seat.

20. A control valve according to claim 19, comprising another valve seat on said first named means about said first named passage and opposed to said first named valve seat, and resilient means urging said first named valve means toward engagement with said other valve seat to permit only the return flow of the applied fluid pressure through said first named passage means.

21. A control valve according to claim 14, comprising opposed effective areas on said first named means respectively subjected to the separate supplied fluid pressures, said first named means being movable in response to said one supplied fluid pressure acting on one of said areas in the event of the failure of the other of said supplied fluid pressures toward one of its translated positions out of metering engagement with said metering means to obviate the metering effect thereof on said one supplied fluid pressure.

22. A control valve according to claim 21, comprising abutment means on said housing for engagement with said metering means to limit the movement thereof in response to the one supplied fluid pressure toward metering engagement with said first named means when said first named means is in its one translated position.

References Cited

UNITED STATES PATENTS 2,408,513  10/1946  Gunderson.
3,162,491  12/1964  Van Winsen _____ 303—22 X MILTON BUCHLER, Primary Examiner J. J. McLAUGHLIN, JR., Assistant Examiner U.S. Cl. X.R.

60—54.5; 137—87, 505.11; 188—151, 152; 200—82; 303—84

UNITED STATES PATENT OFFICE

CERTIFICATE OF CORRECTION

Patent No. 3,472,559          Issued October 14, 1969

Richard C. Bueler

It is certified that error appears in the above-identified patent and that said Letters Patent are hereby corrected as shown below:

Column 1, line 42, "proprotioning" should read -- proportioning --. Column 4, line 23, "forme" should read -- force --; same line, "$P_2 A_2$" should read -- $P_2 A_3$ --; line 25, "99" should read -- 39 --. Column 5, line 27, "displace" should read -- displaced --. Column 9, line 30, "meteing" should read -- metering --. Column 13, line 60, delete in entirety and insert therefor -- centered position toward opposed translated positions --; line 61, delete in entirety and insert therefor -- in response to oppositely directed differentials in excess --; line 71, after "named" insert -- means --. Column 14, line 4, "ancrease" should read -- increase --.

Signed and sealed this 19th day of May 19 70.

(SEAL)
Attest:

Edward M. Fletcher, Jr.
Attesting Officer

WILLIAM E. SCHUYLER, J
Commissioner of Patent